United States Patent [19]

Shaw

[11] Patent Number: 4,509,233

[45] Date of Patent: Apr. 9, 1985

[54] ROPE CLAMP CONSTRUCTION

[75] Inventor: Charles R. Shaw, Twinsburg, Ohio

[73] Assignee: Esmet, Inc., Canton, Ohio

[21] Appl. No.: 504,625

[22] Filed: Jun. 15, 1983

[51] Int. Cl.³ .................... F16G 11/00; H02G 15/08
[52] U.S. Cl. .................... 24/136 R; 24/115 M; 24/122.3; 24/136 L; 285/55; 339/268 R
[58] Field of Search ........... 24/136 L, 136 R, 115 M, 24/122.3; 339/273 R, 273 F, 268 K; 403/369, 371, 374; 285/55

[56] References Cited

U.S. PATENT DOCUMENTS

| 221,125 | 12/1879 | Brady . | |
|---|---|---|---|
| 508,587 | 11/1893 | Trumbull . | |
| 636,641 | 11/1899 | Davin | 24/136 R |
| 831,548 | 9/1906 | Fleeger . | |
| 2,078,051 | 4/1937 | Berndt . | |
| 2,266,357 | 12/1941 | Cooke | 24/122.3 |
| 2,533,064 | 12/1950 | Streader | 24/122.3 |
| 2,678,963 | 5/1954 | Everhart | 339/268 R |
| 3,798,348 | 3/1974 | Van Toorn | 339/268 R |
| 3,852,850 | 12/1974 | Filhaber . | |
| 3,879,147 | 4/1975 | Morell . | |
| 3,952,377 | 4/1976 | Morell . | |
| 4,120,083 | 10/1978 | Echols | 285/55 |
| 4,214,728 | 7/1980 | Fleischer | 285/55 |

FOREIGN PATENT DOCUMENTS

| 346025 | 1/1937 | Italy | 24/115 M |
|---|---|---|---|
| 123046 | 10/1926 | Switzerland | 24/136 R |
| 208803 | 2/1940 | Switzerland | 24/136 R |
| 666004 | 2/1952 | United Kingdom | 24/122.3 |

Primary Examiner—Victor N. Sakran
Attorney, Agent, or Firm—Michael Sand Co.

[57] ABSTRACT

An improved clamp for nonmetallic rope has a plug formed with an annular collar at one end and a plurality of tapered segments formed integrally with the collar and extending outwardly therefrom. The plug has a hollow axial bore defined by a serrated cylindrical surface to increase the gripping effect on a rope telescopically inserted into the bore. The plug is telescopically inserted into the tapered bore of an outer sleeve which compresses the tapered segments of the plug against the rope. The length of the plug is at least ten times greater than the diameter of its bore, which in combination with the annular collar, provides an increased clamping pressure between the serrated surfaces of the tapered segments and the rope throughout the length of the plug. The outer tapered surfaces of the plug segments and the internal bore of the sleeve has a low friction, corrosion resistant coating applied thereto whereby the axial component of the wedging force between the plug and sleeve will be less than the axial component of the friction force between the rope and plug bore preventing slipping of the rope from within the plug bore. The angle of taper of the plug is approximately 4° or less and is equal to or greater than the taper of the sleeve bore.

22 Claims, 13 Drawing Figures

ROPE CLAMP CONSTRUCTION

TECHNICAL FIELD

The invention relates to clamps and in particular to clamps for nonmetallic rope. More particularly the invention relates to a clamp for terminating rope formed of continuous filament synthetic fibers which provides a relatively small compressive force over a relatively long length of rope to prevent damage to the fragile synthetic fibers while maintaining sufficient gripping force on the rope even if the tension on the rope varies throughout the rope life.

BACKGROUND ART

There have been numerous types of clamps for use in terminating ropes and cable and other types of flexible and rigid conductors under tension. Certain of these clamps use a wedging action whereby the greater the tension on the rope, the tighter the clamp will grip the rope. Many of these wedge type clamps use a tapered plug which is slidably mounted within a complementary tapered bore found in an outer sleeve. Some examples of these prior tapered plug-sleeve type clamps are shown in U.S. Pat. Nos. 222,125; 508,587; 831,548; 2,078,051; 3,852,850; 3,879,147 and 3,952,377.

Although many of these prior clamp constructions do perform satisfactory for certain types of rope and cable terminations, they have not been satisfactory for use in providing a terminal clamp for certain recently developed nonmetallic synthetic rope. This rope is formed of a continuous filament, impregnated fiberous material which provides an extremely flexible, strong member, having a very high strength to weight ratio. This type of rope is nonconductive and is noncorroding.

It also has an extremely high modulus of elasticity and strength in the axial direction. Due to its corrosive resistance and nonconductivity, it is extremely useful on ships or for other marine installations since it is unaffected by the salt water which readily attacks metal cables and ropes. It also has many uses in the electrical industry for construction and maintenance applications. Its noncorrosiveness also provides an extremely long life without loss of strength and holding power.

One disadvantage of such synthetic fiberous rope is that it is relatively brittle when bent or experiencing a compressive load transverse to the axis of the rope. This characteristic makes it extremely difficult to provide a satisfactory terminal connector or clamp since most clamps exert a strong compressive force on the rope over a very small area which will cause the individual fibers to crimp or bend which will break or seriously affect the safety factor of the rope.

One known method of terminating such fiberous rope is a "potting" procedure in which the rope end is placed in a void of a clamp and filled with a chemical composition which hardens about the rope to secure it in the clamp. Another type of rope has a terminal loop woven into the end of the rope at the factory. Either type of terminal is relatively expensive and unsatisfactory for use in the field and is suitable only when the exact length is known and remains constant when installed.

Thus, the need has existed for a clamp construction which will provide a small compressive force over a relatively long length of rope to prevent damage to the fragile synthetic fibers in the transverse direction, yet will maintain sufficient gripping force on the rope even when the rope tension varies and is subjected to a highly corrosive environment.

DISCLOSURE OF THE INVENTION

Objectives of the invention include providing an improved clamp construction for nonmetallic rope made from a continuous filament, impregnated fiberous material in order to provide a relatively small compressive force over a relatively long length of the rope to prevent damage to the fragile fibers of the synthetic filament rope. Another objective is to provide such a clamp in which the rope is telescopically inserted into a cylindrical bore of a plug which is formed by a plurality of tapered segments which are formed integrally with and extend outwardly from an annular collar formed at the small end of the plug, and in which the plug is telescopically slidably mounted within a complementary-shaped tapered bore of an outer sleeve which clamps the segments tightly against the rope as the plug is advanced by the tension of the rope along the sleeve bore.

Still another objective of the invention is to provide such a clamp construction in which the internal bore of the outer sleeve and the outer surface of the tapered plug which is slidably engaged therewith, has a coating of a friction reducing corrosion resistant material which maintains the axial component of the wedging force between the plug and outer sleeve less than the axial component of the friction force exerted on the rope by the plug segments to ensure that the gripping force on the rope is always larger than the tension on the rope to prevent the plug from "backing off" excessively from the outer sleeve which could result in the rope slipping free from the tapered plug. A still further objective is to provide such a clamp in which the plug is formed with a cylindrical bore, generally equal to or slightly less than the outer diameter of the rope to be gripped thereby, and in which the bore is formed with serrations to increase the gripping force afforded thereby.

A further objective of the invention is to provide such a clamp construction in which the length of the gripping surface of the tapered plug is at least ten times greater than the diameter of the rope gripped thereby to provide the desired small compressive force over the relatively long length of rope to prevent damage to the fragile synthetic fibers, and in which the taper angle of the plug and sleeve bore is preferably 4° or less to assist the clamp in achieving this desired gripping feature. Still another objective is to provide such a clamp in which the tapered segments of the plug are separated by slots extending axially along the plug whereby the segments, when compressed toward each other, will provide a gripping pressure which increases along the length of the rope from the small end toward the large end instead of in a decreasing relationship as in prior tapered plug type clamps.

A further objective of the invention is to provide such a clamp construction in which the synthetic fiber rope may have an outer jacket of rubberized or synthetic material providing mechanical protection and increased corrosive resistance to the rope fibers, and in which the rope may have a center electrical conductor extending throughout the length of the rope.

These objectives and advantages are obtained by the improved rope clamp construction of the invention, the general nature of which may be stated as including an elongated sleeve formed with an internal tapered bore; a tapered plug slidably mounted within the tapered bore of the sleeve for gripping a nonmetallic fiberous rope within a bore formed in and extending axially throughout the length of the plug; the plug having an annular collar formed at one end and a plurality of tapered segments formed integrally with the collar and extending outwardly therefrom, said plug having a length at least ten times greater than the diameter of the plug bore; and a friction reducing, corrosive resistant coating on the plug and on the internal bore of the sleeve to facilitate the sliding movement of the plug within the sleeve bore.

BRIEF DESCRIPTION OF THE DRAWINGS

A preferred embodiment of the invention, illustrative of the best mode in which applicant has contemplated applying the principles, is set forth in the following description and shown in the drawings, and is particularly and distinctly pointed out and set forth in the appended claims.

Similar numerals refer to similar parts throughout the drawings.

BEST MODE FOR CARRYING OUT THE INVENTION

Figure 1:
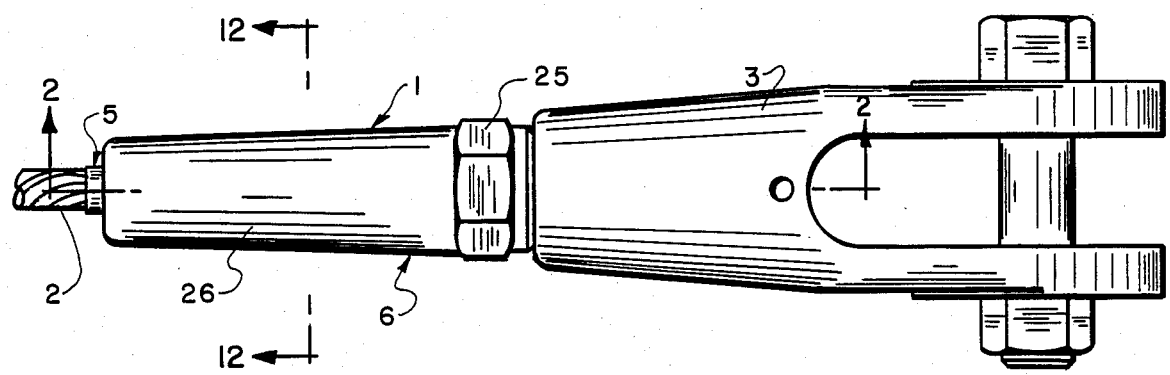
FIG. 1 is an elevational view showing the improved rope clamp gripping a section of rope and connected to a mounting clevis.

The improved rope clamp is indicated generally at 1, and is shown in FIG. 1 clamping the end of a rope 2. A clevis 3 is mounted on one end of clamp 1 for connecting the clamp to a terminal structure. Clevis 3 may be replaced by other types of clamp terminals such as an eye socket assembly, a hook-shaped member, or the like.

Clamp 1 includes two main components, a tapered plug and an outer sleeve, indicated generally at 5 and 6, respectively. Plug 5 (FIGS. 3-7) has an elongated configuration circular in cross section and preferably is formed of steel, stainless steel, bronze, aluminum, etc. In accordance with one of the features of the invention, plug 5 is formed at its small diameter end with an annular end collar 7 and a plurality of arcuate-shaped tapered segments 8. Tapered segments 8 are formed integrally with end collar 7 and extend axially outwardly therefrom. Segments 8 preferably are similar to each other, each having a tapered outer surface 9 which extends outwardly upwardly from collar 7 and a concavely curved inner surface 12 connected by radially extending surfaces 10.

Figure 11:
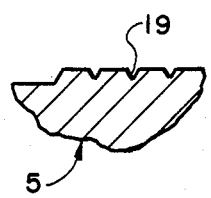
FIG. 11 is an enlarged fragmentary sectional view showing the serrations formed on the internal bore of the plug of FIG. 3.
Figure 12:
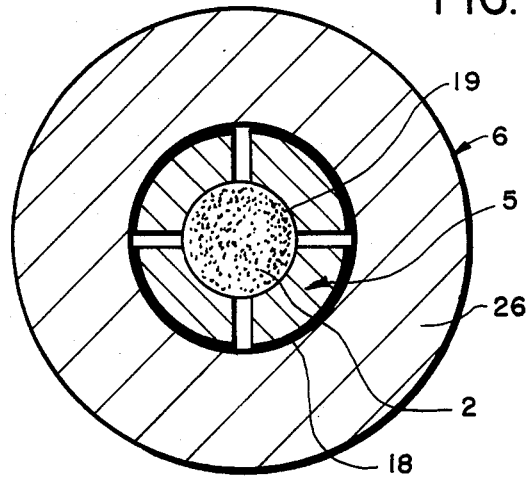
FIG. 12 is a greatly enlarged transverse sectional view taken on line 12—12, FIG. 1.

Preferably there are four tapered segments 8 although three or more would perform satisfactorily. Tapered segments 8 are separated by generally axially extending slots 11 which are located between surfaces 10 of adjacent segments 8 and extend partially into annular collar 7. Concavely curved inner surfaces 12 form a cylindrical bore 13 which extends throughout the length of segments 8 and aligns with a bore 14 of end collar 7 to form a continuous cylindrical bore 15 which extends throughout the length of plug 5 terminating in open ends 16 and 17. Concave inner surfaces 12 are formed with serrations 19 (FIG. 11) to increase the gripping action of tapered segments 8 against rope 2 which is telescopically inserted within plug bore 15.

Figure 2:
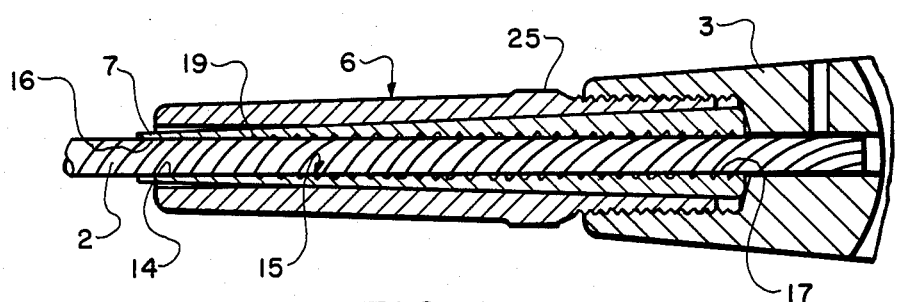
FIG. 2 is a longitudinal sectional view taken on line 2—2, FIG. 1.
Figure 4:
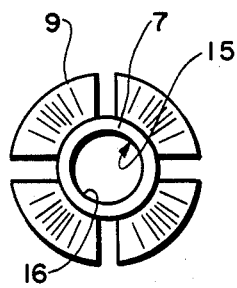
FIG. 4 is an enlarged left-hand end view of the tapered plug of FIG. 3.
Figure 3:
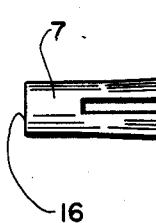
FIG. 3 is an elevational view of the rope clamp plug removed from the outer sleeve.
Figure 5:
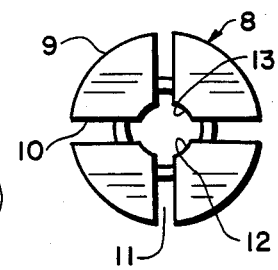
FIG. 5 is an enlarged right-hand end view of the tapered plug of FIG. 3.
Figure 9:
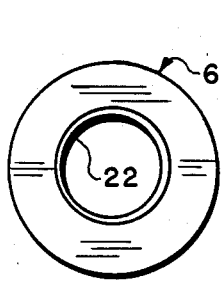
FIG. 9 is an enlarged left-hand end view of the clamp sleeve of FIG. 8.
Figure 8:
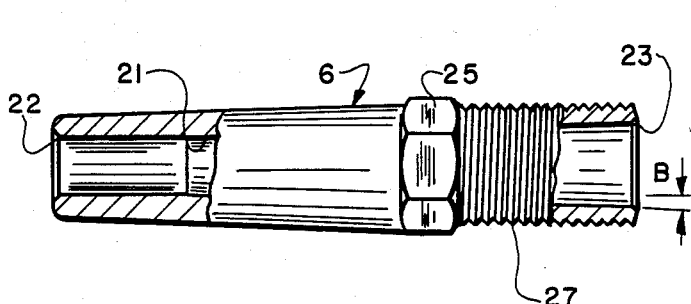
FIG. 8 is an elevational view of the rope clamp sleeve, portions of which are broken away and in section.
Figure 10:
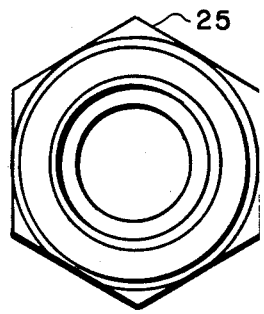
FIG. 10 is an enlarged right-hand end view of the sleeve of FIG. 8.

Outer sleeve 6 has a tapered inner bore 21 which extends throughout the length of sleeve 6 terminating in open ends 22 and 23 (FIGS. 8-10). The outer surface of sleeve 6 is provided with a central multi-flat-sided area 25 which can be gripped by a wrench or other tool when connecting sleeve 6 to clevis 3 or other terminal connector. A tapered area 26 extends outwardly downwardly from flat sided area 25 toward open end 22 and an externally threaded cylindrical portion 27 extends outwardly from the other side of area 25 terminating in open end 23. Clevis 3 is formed with an internally threaded opening at one end which is threadably engaged with sleeve area 27 as shown in FIGS. 1 and 2, and is located closely adjacent to or in abutment with the outer end of plug 5 to serve as a stop to limit the movement of plug 5 in the "non-holding" direction with respect to sleeve 6.

In accordance with another of the features of the invention, tapered outer surfaces 9 of plug segments 8 and tapered surface 20 which forms sleeve bore 21 are coated with a friction reducing corrosive resistant material 18. One type of coating is a filled fluorcarbon material produced by Whitford Corporation of West Chester, Penna. under its trademark Xylan 1052. This coating provides a low friction surface between the slidably engaged tapered surfaces 9 and 20 (FIG. 2) and maintains the axial component of the wedging force exerted between tapered segments 8 and tapered bore 21 of sleeve 6 less than the axial component of the friction force exerted by concave surfaces 12 of tapered segments 8 against rope 2.

This force relationship provided by the low friction coating assures that the gripping force exerted on the rope is always larger than the tension on the rope to prevent the rope from slipping from within plug bore 5. It also allows plug 5 to seat further in sleeve 6 to provide additional compressive forces against rope 2 if higher tensile loads are exerted on the rope even after clamp 1 has been in use for a long period of time in a corrosive environment. The corrosive resistant coating will prevent the plug from "freezing" in sleeve bore 21.

Figure 6:
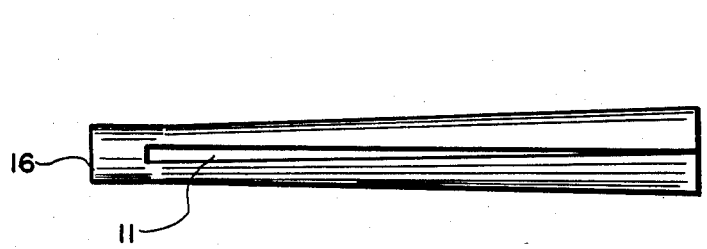
FIG. 6 is an elevational view similar to FIG. 3 with the large end of the plug in a compressed condition.
Figure 7:
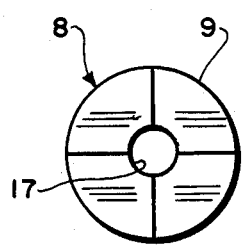
FIG. 7 is an enlarged right-hand end view of the plug of FIG. 6.

In accordance with another feature of the invention, the length of tapered segments 8 is at least ten times greater than the diameter of plug bore 5 which will be complementary to the outer diameter of rope 2. Also, the angle of taper of segments 8 and of sleeve bore 21 (indicated at "A", FIG. 3 and "B", FIG. 8) preferably is 4° or less with the taper of sleeve bore 21 being equal to or less than the taper of segments 8. This relationship provides a small compressive force over a relatively long length of rope which prevents damage to the fragile synthetic filament rope fibers in the transverse direction. This gripping relationship also is enhanced by annular collar 7 from which tapered segments 8 extend, and the separation of segments 8 by slots 11. Collar 7 preferably has a length of approximately 8% of the total axial length of plug 5. As plug 5 advances along tapered bore 21, the larger diameter open end 17 of plug 5 is compressed against the rope generally with a greater pressure than the other areas of segments 8. This is in contrast to prior art clamps using camming plugs which have completely separated tapered segments in which the pressure is extremely great at the start of the tapered area and then decreases rearwardly along the tapered area. This results in a high concentration of the clamping force at the start of the clamping zone which could damage the synthetic fibers of the type of rope with which clamp 1 is intended primarily for use. As can be seen in FIG. 6 which shows the configuration that the outer ends of segments 8 assume when compressed, the clamping pressure increases along the length of that portion of rope 2 located within plug 5 from collar 7 toward larger open end 17 of plug 5 since the tapered segments are compressed increasingly toward each other due to annular collar 7 which transmits the wedging action exerted against tapered segment surfaces 9 by tapered surface 20 of sleeve bore 21 increasingly throughout the length of plug 5 and correspondingly against rope 2. Preferably four tapered segments 8 are used as shown in the drawings although three or more would be satisfactory. This plurality of segments prevents the rope from being flattened out as plug 5 is advanced along sleeve 6.

Rope 2 preferably is formed of continuous filament impregnated fiber material in which the impregnation lubricates the raw fibers converting the monofilaments into a single cohesive strong member. One such type of rope 2 is distributed by Philadelphia Resins Corporation of Montgomeryville, Pa. under its trademark Phillystran. Such rope is noncorrosive and has an extremely high strength-to-weight ratio and is nonconductive which will eliminate radio and electrical equipment interference and will reduce the danger of electrical shock. It also reduces maintenance and replacement cost especially when used on ships or near salt water.

Figure 13:
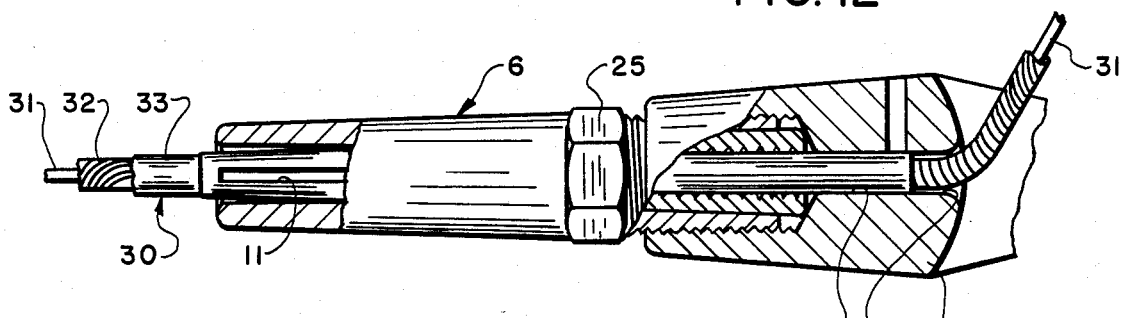
FIG. 13 is a view similar to FIG. 2 with portions broken away and in sections, showing the improved clamp with a modified rope.

If desired, a modified type of rope indicated generally at 30, may be terminated by improved clamp 1 as shown in FIG. 13. Rope 30 has a central electrical conductor 31 surrounded by rope strands 32 which are formed from the same impregnated synthetic fiberous material discussed above. Also, a jacket 33 formed of rubber, neoprene or similar synthetic material may be molded about the outer surface of rope 30 forming a protective covering to provide additional mechanical protection against cuts, abrasions, etc. Clamp 1 operates in the same manner as described above with respect to rope 2 when clamping rope 30 with tapered segments 8 gripping jacket 33 and the inner rope strands and conductor 31 therein as the plug advances along taper bore 21 of sleeve 6. With modified rope 30, a clevis 34 will be used having a conductor core passage 36 formed therein, through which the conductor 31 passed for connection to electrical apparatus for other types of equipment. Jacket 33 will terminate in a socket 37 formed in clevis 34.

The improved rope clamp construction has a number of advantages not obtained with known prior art clamps. It provides a uniform clamping pressure throughout a relatively long length of rope by forming the length of the clamping segments at least ten times greater than the diameter of the plug and correspondingly than the diameter of the rope eliminating excessive pressure from being applied to a confined area of the rope which would result in damage to the filaments, which are relatively brittle in the transverse direction. Preferably the length of each of the segments is within the range of ten and twenty times the rope diameter, which range has been found to provide the most efficient and satisfactory clamping result. Also, the taper of the plug which is 4° or less, in combination with the elongated length of the plug assists in achieving this clamping efficiency. Furthermore, the taper of the plug preferably is equal to or greater than the taper of the tapered bore of the outer sleeve.

Another advantage and feature of the improved rope clamp is the friction reducing coating applied to the sliding, mating surfaces of the plug and sleeve bore to prevent the plug from "freezing up" or "backing off" within the sleeve bore. It also prevents the rope from slipping out of the plug bore due to varying tensions on the rope.

Accordingly, the improved rope clamp construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved rope clamp construction is constructed and used, the characteristics of the improved construction, and the advantageous, new and useful results obtained; the new and useful structures, devices, elements, arrangements, parts, and combinations, are set forth in the appended claims.

What is claimed is:

1. An improved rope clamp construction including:
   (a) an elongated sleeve having first and second ends and formed with an internal tapered bore converging toward the second end;
   (b) a tapered plug slidably mounted within the tapered bore of the sleeve for gripping a nonmetallic fibrous rope within a bore formed in an extending axially throughout the length of the plug;
   (c) the plug having an annular collar formed at one end and a plurality of tapered segments formed integrally with the collar and extending outwardly therefrom, said plug having a length between ten and twenty times greater than the diameter of the plug bore, with the annular collar being located toward the second end of the sleeve and with the taper of the tapered segments extending in the same direction as the taper of the internal tapered bore of said sleeve;

(d) a friction reducing, corrosive resistant coating on the plug and on the internal bore of the sleeve to facilitate the sliding movement of the plug within the sleeve bore; and (e) attachment means removably mounted on the first end of the sleeve for attaching the sleeve and internally mounted plug to a termination structure.

2. The clamp construction defined in claim 1 in which the plug bore is formed with serrations.

3. The clamp construction defined in claim 1 in which the plug has four tapered segments, each generally equal in cross section to the quadrant of a circle.

4. The clamp construction defined in claim 1 in which the annular collar has a length of approximately 8% of the total axial length of the plug.

5. The clamp construction defined in claim 1 in which the reduced friction, corrosive resistant coating is a filled fluorocarbon.

6. The clamp construction defined in claim 1 in which the taper of the outer surface of the plug and inner surface of the sleeve bore is 4° or less.

7. The clamp construction defined in claim 1 in which the taper of the plug is equal to or greater than the taper of the sleeve bore.

8. The clamp construction defined in claim 1 in which the plug has a greater axial length than the sleeve.

9. The clamp construction defined in claim 1 in which the tapered segments are separated by generally axially extending slots which extend partially into the annular collar.

10. The clamp construction defined in claim 1 in which the first end of the sleeve is externally threaded; and in which the attachment means is formed with an integrally threaded opening which is engaged with the threaded sleeve end for removably mounting the attachment means on said sleeve.

11. The clamp construction defined in claim 10 in which the attachment means is a clevis.

12. The clamp construction defined in claim 10 in which the other end of the plug extends outwardly beyond the first end of the sleeve and terminates within the internally threaded opening of the attachment means; and in which the attachment means is engageable with said other end of the plug to limit the movement of the plug out of tapered engagement with the tapered sleeve bore.

13. An improved rope and clamp combination including:

(a) a length of nonmetallic rope;

(b) a clamp having an outer sleeve formed with a smooth continuously straight tapered internal bore converging from a first end toward a second end of said sleeve, and a plug telescopically mounted within said tapered bore;

(c) said plug having an annular collar at one end located generally adjacent the second end of the sleeve, and at least three tapered segments having smooth continuously straight tapered outer surfaces complementary to the tapered internal bore of the sleeve formed integrally with the collar and extending upwardly outwardly therefrom toward the first end of the sleeve;

(d) a cylindrical-shaped internal bore formed in the plug by the tapered segments with the rope being telescopically mounted in said bore and with the taper of the segments being complementary to the taper of the sleeve bore whereby the segments grip the rope as the plug moves along the sleeve bore and is slidably mounted therein;

(e) said plug bore having a length between ten and twenty times greater than the diameter of the rope; and (f) attachment means engaged with the first end of the sleeve for attaching the clamp to a structure.

14. The combination defined in claim 13 in which the tapered segments of the plug and the sleeve bore are coated with a friction reducing and corrosive resistant material whereby the axial component of the wedging force between the plug and sleeve is less than the axial component of the compression gripping force between the rope and tapered plug segments.

15. The combination defined in claim 13 in which the plug bore is formed with serrations to increase the gripping efficiency of the segments.

16. The combination defined in claim 13 in which there are four tapered segments.

17. The combination defined in claim 16 in which the tapered segments of the plug are separated by generally axially extending slots.

18. The combination defined in claim 17 in which the plug slots extend partially into the annular collar.

19. The combination defined in claim 13 in which the taper of the plug segments and sleeve bore is 4° or less.

20. The combination defined in claim 13 in which the rope is formed of a continuous filament, impregnated fiberous material.

21. The combination defined in claim 13 in which the rope is covered with a jacket of synthetic nonmetallic material.

22. The combination defined in claim 21 in which the jacket is formed of neoprene.

* * * * *